United States Patent
Meinig et al.

(10) Patent No.: US 8,042,529 B2
(45) Date of Patent: Oct. 25, 2011

(54) DEVICE FOR ELIMINATING OIL PARTICLES FROM THE CRANKCASE VENTILATION GAS IN AN INTERNAL COMBUSTION ENGINE

(75) Inventors: Uwe Meinig, Walsrode (DE); Sieghard Pietschner, Greven (DE)

(73) Assignee: Hengst GmbH & Co. KG, Muenster (DE)

( * ) Notice: Subject to any disclaimer, the term of this patent is extended or adjusted under 35 U.S.C. 154(b) by 818 days.

(21) Appl. No.: 11/993,363

(22) PCT Filed: Jun. 24, 2006

(86) PCT No.: PCT/EP2006/006039
§ 371 (c)(1),
(2), (4) Date: Apr. 8, 2008

(87) PCT Pub. No.: WO2007/000281
PCT Pub. Date: Jan. 4, 2007

(65) Prior Publication Data
US 2009/0199826 A1 Aug. 13, 2009

(30) Foreign Application Priority Data
Jun. 25, 2005 (DE) .................. 20 2005 009 990 U

(51) Int. Cl.
*F02B 25/06* (2006.01)
(52) U.S. Cl. .................. 123/572; 123/573
(58) Field of Classification Search .......... 123/572–574, 123/41.86
See application file for complete search history.

(56) References Cited

U.S. PATENT DOCUMENTS

| 3,261,146 | A | | 7/1966 | Malec | |
|---|---|---|---|---|---|
| 4,627,406 | A | * | 12/1986 | Namiki et al. | 123/573 |
| 5,024,203 | A | * | 6/1991 | Hill | 123/573 |
| 6,290,738 | B1 | | 9/2001 | Holm | |
| 6,435,170 | B1 | * | 8/2002 | Hamelink et al. | 123/572 |
| 6,443,182 | B1 | * | 9/2002 | Hathcock | 137/514.5 |
| 7,699,029 | B2 | * | 4/2010 | Herman et al. | 123/41.86 |
| 2002/0100465 | A1 | | 8/2002 | Pietschner | |
| 2005/0279336 | A1 | * | 12/2005 | Dworatzek et al. | 123/572 |
| 2006/0254566 | A1 | * | 11/2006 | Yasuhara | 123/572 |

FOREIGN PATENT DOCUMENTS

| EP | 1068890 | 1/2001 |
|---|---|---|
| EP | 1285152 | 2/2003 |

* cited by examiner

*Primary Examiner* — M. McMahon
(74) *Attorney, Agent, or Firm* — Greer, Burns & Crain, Ltd.

(57) ABSTRACT

A device for eliminating oil particles from the crankcase ventilation gas of an internal combustion engine. The device is located in the flow duct of the gas that runs from the crankcase to an induction tract of the engine. The device includes an oil separator in the form of an outlet for the gas with a deflection of the flow, causing the oil particles to be deposited on a baffle surface and thus to be eliminated from the crankcase ventilation gas flow. The device has an infeed cross-section, which lies upstream of the baffle surface when viewed from the flow direction of the crankcase ventilation gas, and which is sub-divided into several infeed sub-sections. The baffle surface is a solid surface that is devoid of perforations. The baffle surface is configured on a valve body, which lies downstream of the infeed sub-sections when viewed in the flow direction of the gas, and which is pretensioned by a force. The valve body can be displaced in the opening direction in opposition to the pre-tension, as a result of the differential pressure in the gas between the crankcase and the induction tract.

32 Claims, 8 Drawing Sheets

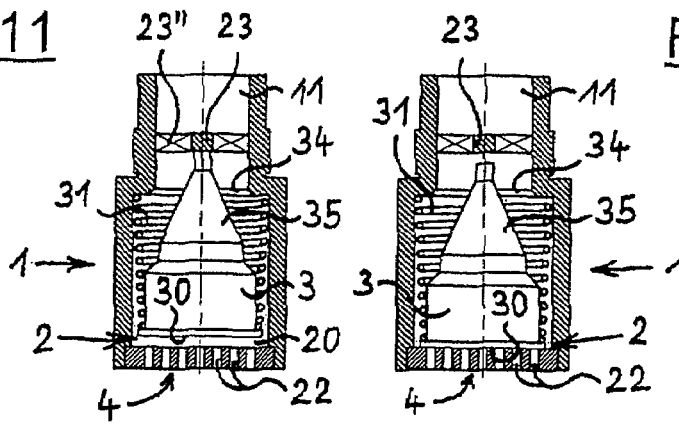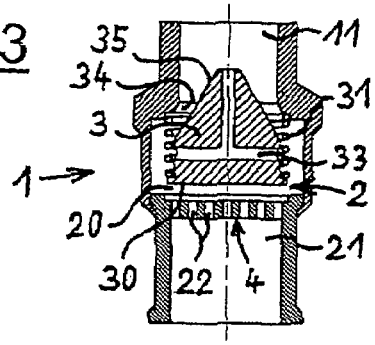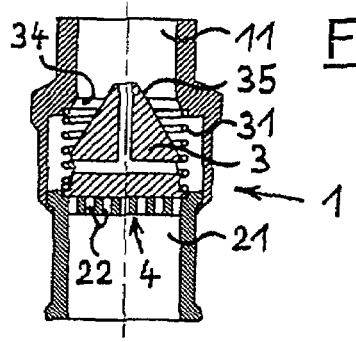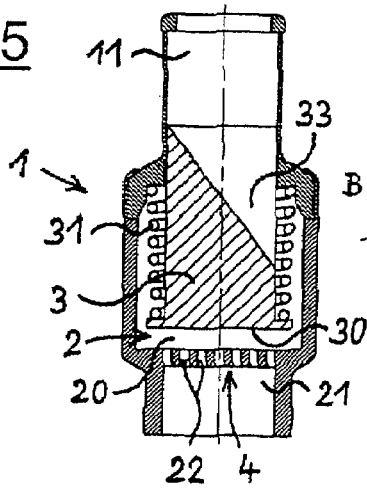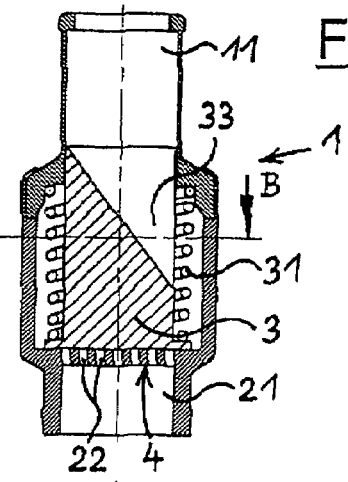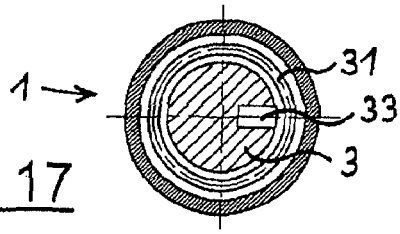

DEVICE FOR ELIMINATING OIL PARTICLES FROM THE CRANKCASE VENTILATION GAS IN AN INTERNAL COMBUSTION ENGINE

BACKGROUND OF THE INVENTION

The present invention relates to a device for eliminating oil particles from the crankcase ventilation gas in an internal combustion engine, wherein the device is arranged in the flow duct of the crankcase ventilation gas that runs from the crankcase to an induction tract of the internal combustion machine and wherein the device exhibits an oil separator in the form of an outlet for the crankcase ventilation gas with a deflection of the flow, as a result of which oil particles are deposited on a baffle surface and thus eliminated from the crankcase ventilation flow.

A device for deoiling crankcase ventilation gas in an internal combustion is known from EP 1 285 152 B1, wherein the device exhibits at least one oil separator as well as a bypass duct bypassing the oil separator. In the bypass duct at least one means is provided which opens and closes the bypass duct dependent on a differential pressure. In the process the bypass duct and the means for opening and closing of the bypass duct are constructed in such a way that in the case of an opened bypass duct as a result of the deflection of the flow and impact separation a deoiling of the crankcase ventilation gas in the bypass duct is effected. In the normal operation of this device the bypass duct is however closed and the total volume flow of the crankcase ventilation gases flows through the oil separator, which is preferably constructed here as a cyclone separator. Only in the case of extraordinarily great quantities of crankcase ventilation gas is the bypass duct additionally opened, after which the oil separator, here the cyclone separator, and the bypass duct are then flowed through in parallel to the crankcase ventilation gas. With regard to the relatively fine particle sizes of the oil particles in the crankcase ventilation gas the bypass duct with the means for opening and closing the bypass duct located within possesses only a relatively poor oil separation effect, so that with this bypass duct and the means provided within for opening and closing the bypass duct only in combination with another oil separator, here preferably a cyclone separator, is a sufficient total degree of separation achieved.

A device for the separation of gas and liquid particles in a mixture of gas and fluid particles flowing in a line and a method for the separation thereof are known from DE 100 51 307 A1. This device comprises a line in which the mixture flows. A baffle element is arranged in the line which gives rise to the separating eddy current and thus separates gas on the one hand and liquid particles on the other from one another. The baffle element is preferably constructed here in the form of a baffle plate which is aligned perpendicular to the longitudinal direction of the line. Also in the case of this known device the degree of separation with regard to relatively fine particle sizes, in particular as they are present in the crankcase ventilation gas of an internal combustion engine, is relatively low. Therewith this known device is only suitable for applications in which the liquid particles are relatively large.

DE 103 20 215 A1 shows an oil separation device for an internal combustion engine, which is inserted in a flow path for blow-by gas loaded with oil particles between the crankcase and the induction tract of the internal combustion engine and which exhibits an oil separator with a narrowed outlet, through which the flow of the oil-loaded blow-by gas is conducted and deflected, wherein oil particles are separated at a wall, from which the oil particles flow back to the crankcase in an oil return. Further provision is made here that the at least one outlet is formed by a gap of small, variable gap width and great gap passage cross-sections, wherein the gap width is changed dependent on the volume flow of the blow-by gas through the gap against elastic force. The elastic force can in the process be applied by means of a coil spring or one or more spring tongues. The separation of the oil particles takes place by means of deflection and precipitation at a baffle surface, which is either a surface radially surrounding the coil spring at a distance or is a baffle surface developed at the spring tongue. Also in the case of this known device the degree of separation effect is high only in the case of relatively large oil particles due to the comparatively slight deflection of the gas flow, while it is lower for fine oil particles which predominate in the crankcase ventilation gas.

The older DE 10 2004 049 089 A1 which was published later shows a device for the separation of liquid from a gas flow of a crankcase of an internal combustion engine, with an input duct flow connected to the crankcase, an output duct flow connected to an intake manifold of the internal combustion engine and a separation valve arranged between the input duct and the output duct, which exhibits respectively a closing body that can be moved axially with regard to a valve axis and a valve seat cooperating with the closing body. In the process several separation valves are provided which are connected to each other in parallel and which serve as fine separators and/or finest separators.

Preferably the closing bodies of the separation valves are constructed disk-shaped, plate-shaped, latticed or shaped like perforated plates. In the case of an exemplary embodiment of the device in accordance with this publication the closing bodies and the valve openings are constructed latticed or shaped like perforated plates and exhibit several through openings arranged in rows and gaps, wherein valve reinforcing ribs are arranged between the through openings. The through openings of the closing bodies are displaced in such a way to the through openings of the valve openings that in the case of the resting of the closing body on the valve seat the through openings of the closing body through the valve reinforcing ribs of the valve openings and vice versa are closed. Due to the latticed structure in the case of the removal of the closing body from the valve seat many narrow valve gaps are formed, which should make possible a good fine separation.

In the case of this device it is considered disadvantageous that it exhibits a relatively low separation effect with regard to the in particular fine oil droplets carried in the gas flow. In the case of the design of the device with closing bodies and valve openings that are latticed or shaped like perforated plates there is a risk of valve float, which is unfavorable for the function of the device and which can lead to a premature wear and tear and with it failure of the device. In addition the precise geometrical correspondence between ribs on the movable element and the passages on the stationary element in practice with limited technical expenditure can only be achieved with difficulty. A precise radial suspension and anti-twist protection of the unit are required for this. Such an arrangement is impaired in its function through deposits and dirt accumulations.

A pneumatic pressure control valve is known from the older DE 20 2004 013 123 U1 which was published later, said pressure control valve being arranged in the flow of a gas line, whose outlet can be changed automatically by means of the pressure control valve in dependency on the differential pressure between one or more gas pressures present at least one inlet of the pressure control valve. In the process a regulating membrane is provided in the pressure control valve which is impacted on the one hand by a reference pressure and on the other hand by the gas pressure or the gas pressures as well as by a control spring, as a result of which in the case of the change of the reference pressure between the regions adjacent to the regulating membrane the regulating membrane is adjusted and the regulating membrane itself or a closing body actuated by the regulating membrane enlarges or reduces the outlet through a flow cross-section of the pressure control valve. In the process a structure of the pressure control valve adjacent to the flow cross-section on the membrane side forms a stop for the regulating membrane or for the closing body in its closed position. Further at least one preliminary stop is arranged in the pressure control valve in such a way that in the case of the movement of the regulating membrane in closing direction the regulating membrane or the closing body comes into contact with the preliminary stop first and wherein in the case of further movement of the regulating membrane in closing direction the regulating membrane or the closing body then under (further) elastic flexible deformation further reduces the outlet and reaches a final position also in contact with the stop. Further in the process the preliminary stop is formed by at least one open preliminary stop structure lying in the flow cross-section plane on the membrane or closing body side.

With the plane, open preliminary stop structure the pressure control valve, along with its pressure control function, should additionally be given the function of a liquid separator at least to a certain extent. The open preliminary stop structure lies in the flow cross-section, so that a gas with liquid droplets flows first in radial direction from the outside to the inside parallel to the membrane or closing body and then is deflected in axial direction and flows through the individual openings of the preliminary stop structure. In the process at least the larger liquid droplets impact within the openings of the preliminary stop on the latter and can thus be separated from the gas flow.

In the case of this pressure control valve the preliminary stop structure serves first and foremost the purpose of influencing the pressure control behavior in terms of a most constant possible pressure on the inlet side of the pressure control valve. The membrane or the closing body do not form a baffle surface here, because the gas flow direction runs first parallel to the plane of the membrane or of the closing body radially from the outside to the inside and then is deflected in an axial direction through the openings of the preliminary stop structure. Additionally, to achieve the previously mentioned separation effect for liquid droplets carried in the gas an enlarged installation space is necessary, which in the case of narrow space conditions can lead to accommodation problems.

For the present invention therefore one is confronted with the problem of creating a device of the initially named type which avoids the foregoing described disadvantages and with which in the case of a slight technical expenditure an improved degree of separation effect, also with regard to fine oil particles, is achieved. In the process the device should also serve as the controller for controlling the gas volume flows conducted away from the crankcase.

SUMMARY OF THE INVENTION

The solution of the problem succeeds in accordance with the invention with a device of the initially named type which is characterized in that an infeed cross-section which lies upstream of the baffle surface when viewed from the flow direction of the crankcase ventilation gas is sub-divided into several infeed sub-sections, the baffle surface is a solid surface that is devoid of perforations and said baffle surface is configured on a valve body which lies downstream of the infeed sub-sections when viewed in the flow direction of the crankcase ventilation gas and which is pre-tensioned by a force. The valve body can be displaced in the opening direction in opposition to the pre-tension, as a result of the differential pressure in the gas between the crankcase and the induction tract.

With the invention it is advantageously achieved that the crankcase ventilation gas in its flowing against the baffle surface experiences a significantly sharper deflection than in the case of conventional devices without flowing through infeed sub-sections. This leads advantageously to higher centrifugal forces, which lead to an improved precipitation and separation of oil particles from the gas flow. Through the infeed sub-sections, which each exhibit a smaller cross-section of flow than the infeed cross-section in and of itself, the flow of the crankcase ventilation gas is guided and a flow profile with relatively large radii in the region of the deflection of the flow is impeded. Also a flowing through of the baffle surface is excluded here, because the baffle surface is solid and devoid of perforations. Instead of this now each partial flow of the crankcase ventilation gas, which flows through the infeed sub-sections, must pass through a very sharp deflection of the flow with small radii and flow up to the radial outer border of the baffle surface, which causes the separation of fine oil particles also. In this way the degree of effectiveness of the oil separation, in particular with regard to fine oil particles, is significantly increased with a relatively simple measure only requiring a slight additional technical expenditure. At the same time, along with its function as oil separator the device additionally has a function as a controller for controlling of the gas volume flows conducted away from the crankcase. In this connection the device adjusts with regard to the outlet cross-section to the quantity of the respective currently accumulating crankcase ventilation gas of the internal combustion engine, as a result of which the conducting away of the crankcase ventilation gas from the crankcase is automatically adjusted as needed to the severely fluctuating quantities of the crankcase ventilation gas in the operation of the of the internal combustion engine and with this the pressure in the crankcase remains in the prescribed required range.

Preferably provision is further made that the infeed sub-sections run parallel to each other. As a result of this an especially simple geometrical design is obtained, by means of which a simple and cost-effective production is guaranteed. Moreover, in this way all gas partial flows which flow through the infeed sub-sections in the direction of the baffle surface are subject to this same deflection of the flow, so that for each gas partial flow the separation effect is in principle identical.

For the achievement of a maximum separation effect it is further proposed that the infeed sub-sections respectively run at right angles to the baffle surface. With this each gas partial flow is subject to a deflection of the flow of 90°, which promotes an effective separation of the oil particles.

For the achievement of a uniform flow directly before the baffle surface provision is preferably made that the infeed sub-sections each have the form of an oblong duct or of a borehole or of a nozzle. In this way disturbing flow turbulences within the gas partial flows are prevented. Aside from the sharpness or the radius of the deflection of the flow in the region of the baffle surface, the degree of separation of the device also depends on the gas velocity in the region of the deflection of the flow, wherein a higher gas velocity effects a better oil separation, however in principle also requires a higher pressure differential. In order to achieve a higher gas velocity in this region the infeed sub-sections can, as mentioned, each have the form of a nozzle.

In order to increase the separation effect of the device of the device, preferably provision is to be made that the baffle surface is surrounded radially outward by a peripheral wall in development of an annular gap forming a part of the outlet. The annular gap provides for a second sharp deflection of the flow which is in an opposite direction to the first deflection and which effects a further oil separation from the gas flow. In the process oil droplets which have not yet precipitated on the baffle surface of the valve body impact on the peripheral wall due to their inertia of masses and are precipitated there.

One embodiment of the device proposes that in the case of lacking differential pressure between the crankcase and the induction tract the infeed sub-sections can be sealed extensively gas-tight by the valve body. Since in particular a differential pressure is not present when the associated internal combustion engine shuts down, this prevents the escape of crankcase ventilation gases, i.e. hydrocarbon emissions from the crankcase into the environment or the entry into the induction tract of the internal combustion engine through thermal effects where the air filter, an air mass sensor, throttle valves or additional function elements arranged there can be soiled and disturbed in their function.

For the purpose of achievement of a simple and reliable technical solution preferably the force which pre-tensions the valve in closing direction is the force of at least one spring. In particular coil springs are well suited here; said coil springs being variable in wide ranges in their forms and elastic qualities and being easily customizable for the respective application. An alternative solution is the use of a meander spring.

Preferably provision is further made that in the case of the device being in operation position the flow direction in the infeed sub-sections proceeds in essence from the bottom to the top. This preferred flow direction supports the conducting away and deflection of the oil particles precipitated on the baffle surface and thus separated from the gas flow by gravitational effect, so that also with regard to the deflection of the precipitated oil no expensive technical measures are required.

To support the deflection of the precipitated oil preferably an embedded deflection region is constructed in the device radially outside of the baffle surface and below said baffle surface for oil precipitated on the baffle surface, dripping or flowing from said baffle surface. Should the occasion arise, oil precipitated on the peripheral wall also reaches this deflection region so that no separate deflection means must be provided for it.

For reasons of a simple geometric design and a cost-effective producibility of the device the deflection region preferably has the form of a circulating gutter open to the top.

A further embodiment proposes that the deflection region is connected to an oil collecting chamber lying outside of the part of the device flowed through by the crankcase ventilation gas. With this the possibility is created to collect and preserve the separated and deflected oil temporarily until it can be withdrawn or deflected from the oil collecting chamber.

A preferred further development provides in this regard that the oil collecting chamber is connected to the crankcase of the internal combustion engine via a valve and an oil return duct. The oil return duct can be released via the valve when the operating state of the internal combustion engine permits a back flow of the oil from the oil collecting chamber to the crankcase; this is in particular given in the case of the shutdown of the internal combustion engine.

Preferably the previously mentioned valve is a differential pressure controlled valve which automatically opens in the case of a pressure corresponding to the pressure in the induction tract or a pressure lying below the pressure in the crankcase. Such a valve can for example be constructed as a leaf valve which is quite simple structurally and which exhibits the desired automatic function in dependency on the differential pressure. Since, as already mentioned above, the differential pressure in particular in the case of the shutdown of the internal combustion engine is lacking, preferably a recycling of the separated oil to the crankcase of the internal combustion engine takes place in the case of its shutdown. In the operation of the internal combustion engine there is such differential pressure present that the valve is closed so that also no crankcase ventilation gas can reach the device through the oil return duct. The valve is advantageously designed in such a way that in the case of lacking pressure differential, i.e. in the case of the shutdown of the internal combustion engine, it is open.

Further it is proposed that the oil separator in the form of the outlet with deflection of the flow and with the infeed cross-section subdivided into several infeed sub-sections is the only one of the oil separators assigned to the internal combustion engine for the crankcase ventilation gas. Such an embodiment of the device is advantageous because it can be constructed especially simply compact and because it nevertheless achieves a good degree of separation, also with regard to fine oil particles. With this in many application cases the desired degree of separation can already be achieved with this simple design of the device.

In case particularly high demands are placed on the degree of separation of the device, the possibility exists that at least one further oil separator for the crankcase ventilation gas is connected in parallel or in series to the oil separator in the form of the outlet with deflection of the flow and to the infeed cross-section sub-divided into several infeed sub-sections. In this alternative design of the device the separation of the oil particles takes place in two or more oil separators, by means of which a higher overall degree of effectiveness can be achieved in the oil separation.

A preferred further development provides that the at least one further oil separator for the crankcase ventilation gas exhibits an operating principle differing from the oil separator in the form of the outlet with deflection of flow and with the infeed cross-section subdivided into several infeed sub-sections. By means of the application of two or even several differing operating principles a very broad overall separation spectrum can be achieved by the combination of differing separation spectra, each one typical for an operating principle. In the process attention should be paid to the fact that by means of the two or more oil separators the entire spectrum of the oil particle sizes occurring in the crankcase ventilation gas is covered.

A further embodiment provides that the two or more oil separators each exhibit a different opening pressure of the crankcase ventilation gas, beginning at which the relevant oil separator is flowed through. Here the number of currently flowed through oil separators is made dependent on the pressure of the crankcase ventilation gas and with this on its quantity, which is a further contribution to the achievement of a high overall degree of effectiveness in the case of the oil separation from the crankcase ventilation gas.

For the achievement of a compact arrangement even in the last described designs of the device with two or more oil separators preferably provision is made that the two or more oil separators are structurally and spatially combined in one unit.

A cyclone or coalescer is suitable as a further oil separator within the device in accordance with the invention. Both types of oil separators are in particular suitable for the separation of particularly fine oil particles, by means of which these two complement each other well in combination with the first oil separator, in which the separation takes place by means of deflection and impact separation, with regard to the separable spectrum of oil particle sizes.

In order to form the infeed sub-sections in the simplest possible technical manner, a single structure is preferably arranged in the infeed cross-section sub-dividing said infeed cross-section into the several infeed sub-sections. The structure can be produced in one piece with the rest of the device or integrated initially as a separate structural element in the infeed cross-section.

Alternatively the possibility exists of arranging at least two structures in the infeed cross-section sub-dividing it into the several infeed sub-sections, said structures being spaced axially apart from one another, wherein the infeed sub-sections of the one section exhibit an offset at a right angle to the longitudinal direction of the infeed sub-sections relative to the infeed sub-sections of the other structure. In this design of the device a first deflection of the flow with oil separation is already achieved by means of the offset between and in the two structures, a fact which increases the overall degree of effectiveness of the device.

For the device in accordance with the invention provision is further made that the infeed sub-sections are formed by a lattice-like structure with an arrangement of polygonal ducts in the cross-section which provide the infeed sub-sections. Such a structure is on the one hand easy to produce and easy to integrate into the infeed cross-section and on the other hand offers the desired sub-division of the infeed cross-section into several or many infeed sub-sections.

In order to keep the flow resistance brought about by the structure as low as possible, the cross-section of the polygonal ducts is preferably rectangular or square or parallelogram-shaped or hexagonal. In this design a great overall cross-section of the flow can be achieved in proportion to the total area of the structure, wherein the structure simultaneously remains sufficiently stable mechanically.

Alternatively the infeed sub-sections can be formed by a perforated plate-like structure with an arrangement of round ducts in the cross-section which provide the infeed sub-sections. The infeed cross-section is also effectively sub-divided into several infeed sub-sections in this design of the structure. The ducts can be produced here in simple fashion by means of boring.

A further alternative provides that the infeed sub-sections are formed by means of a perforated plate-like structure with an arrangement of annular or annular section-shaped, concentric ducts in the cross-section which produce the infeed sub-sections. Here too the infeed cross-section is effectively sub-divided into several infeed sub-sections; wherein in comparison to the previously mentioned structure here a greater total cross-section of flow can be achieved, by means of which the structure produces a lower flow resistance for the crankcase ventilation gas. Since each infeed sub-section has a relatively large cross-sectional area, disturbing plugging of individual infeed sub-sections is prevented.

In order to prevent the valve body from jamming in the case of its differential pressure-dependent movement within the device and thus resulting in malfunctions of the device, the valve body advantageously exhibits a guide section for an axially movable guidance in the flow duct at its side averted from the baffle surface.

A further embodiment proposes that a stop is provided for limitation of the axial path of movement of the valve body in its opening direction. The opening stop can for example be arranged or molded in or on the flow duct. In this way the maximum size of the outlet for the crankcase ventilation gas is limited by the device to a predefinable dimension. Additionally, as a result this prevents the degree of separation from collapsing in the case of too large of a valve opening (removal of the valve plate from the infeed structure).

Further a closing stop can be provided in the device for the limiting of the axial path of movement of the valve body in its closing direction. The closing stop provides an effective measure against an adhering and freezing of the valve body on the structure forming the infeed sub-sections and prevents malfunctions caused by this. In addition an oil separation takes place here even in the case of small quantities of crankcase ventilation gas, even if its pressure is still so low that the valve body is not elevated.

A further embodiment of the device in accordance with the invention proposes that the valve body cooperates with a second outlet cross-section in an opposite direction to the outlet in which the oil separation takes place for the formation of a flow control valve. In this way in particular an effective and defined limitation of the quantity of the crankcase ventilation gas which can go to the induction tract of the internal combustion engine from the crankcase through the device is achieved. Simultaneously in combination with a ventilation of the crankcase with fresh air the fresh air flow rate is limited to operationally meaningful quantities. In particular this ensures that the internal combustion engine is not impacted with too much additional combustion air and/or too much additional fuel via the crankcase ventilation gas, which in particular is important for a stable idling of the internal combustion engine.

In a more concrete development the valve body is preferably designed downstream with a conical or diagonal section, which is surrounded by the second outlet cross-section. In this way the desired function of flow regulation can be integrated into the device in a very simple technical way, a fact which also keeps production costs low in the case of the equipping of the device with this additional function. Finally in accordance with the invention provision is also made for the embodiment of the device with the flow control valve that the valve body is constructed with at least one gas duct which is permeable by crankcase ventilation gas at the valve body sealing the second outlet cross-section. In this way it is guaranteed that even in the case of a high differential pressure, which leads to a displacement of the valve body against the elastic force in its end position, a minimum cross-section of flow remains free for the crankcase ventilation gas through the device.

In the design of the device with integrated flow control valve the device can be used advantageously for simple and effective crankcase ventilation because the device automatically sets the fresh air flow supplied to the crankcase to operationally optimum quantities.

BRIEF DESCRIPTION OF THE DRAWINGS

In the following exemplary embodiments of the invention will be explained with the help of a drawing. The figures of the drawing show the following:

FIG. 11 and FIG. 12 show the device in a further design in opened and closed state, each in longitudinal section, FIG. 13 and FIG. 14 show the device in a further embodiment in the same representation as in FIGS. 11 and 12, FIG. 15 and FIG. 16 show the device in a further embodiment in the same representation as in FIGS. 11 and 12, FIG. 17 shows the device from FIG. 16 in the cross-section in accordance with intersection line B-B in FIG. 16.

DETAILED DESCRIPTION OF THE PREFERRED EMBODIMENTS

Figure 1:
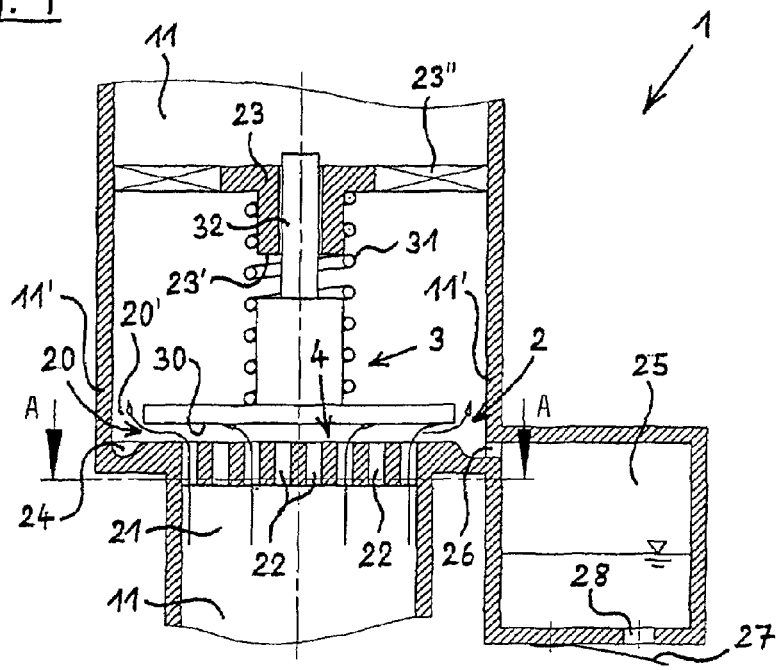
FIG. 1 shows a device in a first design in longitudinal section.

As FIG. 1 of the drawing shows, the device 1 is arranged in a flow duct 11 for the crankcase ventilation gas of an internal combustion engine, wherein the section of the flow duct 11 visible here has the form of a pipe stepped in diameter. The flow direction of the crankcase ventilation gas runs here from the bottom to the top. In the lower part of the flow duct 11 which is smaller in diameter, a structure 4 is arranged, which sub-divides a previously uniform infeed cross-section 21 into a multitude of infeed sub-sections 22. In the example in accordance with FIG. 1 the infeed sub-sections 22 all run parallel to each other and parallel to the longitudinal direction of the flow ducts 11.

Downstream from the structure 4, thus above structure 4 here, a baffle surface 30 is provided, which is formed here by the underside of a valve body 3 which is displaceable in axial direction. The valve body 3 possesses a guide section 32 in its upper part averted from the structure 4, said guide section 32 with which the valve body 3 is guided in an axially displaceable manner in the upper part of the outflow ducts 11. For this purpose a guide body 23 is held above ribs 23″ centrally in the upper visible portion of the flow duct 11. A lower front side of the body 23 forms a stop 23′ for limitation of the axial displacement path of the valve body 3 in the upward direction. The valve body 3 is pre-tensioned by a coil spring 31 with a pre-tension force which pre-tensions downward, thus with regard to the structure 4, in closing direction.

In the state shown in FIG. 1 the valve body 3 is removed from the structure 4, which happens by means of an adjacent differential pressure of the crankcase ventilation gas, namely whenever a higher pressure prevails on the side connected to the crankcase, in FIG. 1 this is the lower side, of the flow duct 11 than on the upper region of the flow duct 11 connected to the induction tract of the internal combustion engine. In the opened state of the valve body 3 the crankcase ventilation gas flows from the lower part of the flow duct 11 first through its uniform infeed cross-section 21 and then split up by the multitude of infeed sub-sections 22 in the direction towards the baffle surface 30 at the underside of the valve body 3. In the outlet 20 between the upper side of the structure 4 and of the baffle surface 30 the partial gas flows flowing through the infeed sub-sections 22 each undergo a very sharp deflection of the flow, which leads to a precipitation of carried along oil particles at the baffle surface 30. The gas flow undergoes a second sharp deflection of the flow on its further path as soon as it reaches the radial outer Border of the baffle surface 30. The gas flow is namely deflected from its radial flow direction here to an axial flow direction, wherein it flows through an annular gap 20′ between the outer periphery of the baffle surface 30 and the inner surface of a peripheral wall 11′ limiting the flow duct 11. Oil droplets which were not precipitated on the baffle surface 30 are not at least partially precipitated on the peripheral wall 11′.

The crankcase ventilation gas flowing through the device 1 is hence effectively freed from carried oil particles within the oil separator 2 formed by the structure 4, the baffle surface 30 and the peripheral wall 11′.

The crankcase ventilation gas freed from oil particles flows upward in accordance with the drawn arrows and reaches the induction tract of the internal combustion engine through the further flow duct 11.

The oil precipitated on the baffle surface 30 is transported under the influence of the gas flow along the baffle surface 30 radially outward and drips downward from the radial exterior border of the baffle surface 30 or of the valve body 3 under the influence of gravitational force. As a result the dripped oil reaches a deflection region 24 within the flow duct 11 formed radially outward from the structure 4, said deflection region 24 having the form of an embedded, circulating gutter open to the top. In the same deflection region 24 under the influence of gravitational force the oil precipitated on the peripheral wall 11′ also flows radially outward from the baffle surface 30.

On the right side of the device in FIG. 1 the deflection region 24 is connected via a flow connection 26 in the form of a borehole to an oil collecting chamber 25 arranged outside of the flow duct 11. A predefinable volume of separated oil can be collected and temporarily stored in this oil collecting chamber 25. An automatic emptying of the oil collecting chamber 25 can take place from time to time via an only partially shown oil return duct 28 with a valve 27 arranged within, wherein advantageously the oil return duct 28, which is shown only in part here, in its further course leads to the crankcase of the associated internal combustion engine. The valve 27 is a leaf valve in the represented example, said leaf valve automatically opening or closing in dependency on the pressure differential present on both sides of the valve 27. In particular this valve 27 opens in the case of the shutdown of the associated internal combustion engine, so that then under the influence of gravitational force the oil can return from the oil collecting chamber 25 to the crankcase.

FIGS. 2 through 6 of the drawing show different designs of the structure 4, said structure 4 providing for the sub-division of the initially uniform infeed cross-sections 21 into the multitude of the smaller infeed sub-sections 22.

Figure 2:
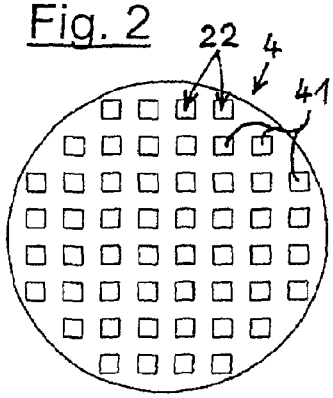
FIG. 2 through FIG. 6 show different structures to be arranged in an infeed cross-section of the device in accordance with FIG. 1 in five different embodiments.

In FIG. 2 a design of the structure 4 is shown in which case the infeed sub-sections 22 are formed by square ducts 41 arranged in a regular grid square.

Figure 3:
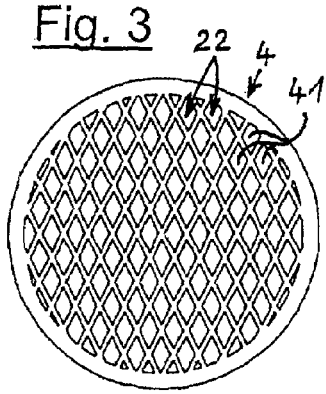

In the case of the example in accordance with FIG. 3 the infeed sub-sections 22 are formed by diamond-shaped ducts 41 in the cross-section, said ducts 41 also forming a regular lattice-like grid.

Figure 4:
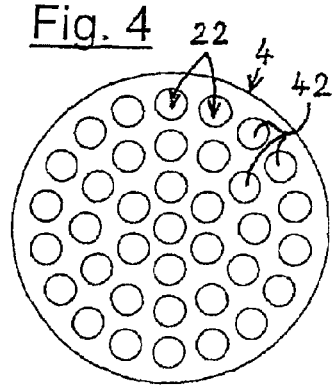

FIG. 4 shows an example of the structure 4, in which case the infeed sub-sections 22 are formed by a number of round ducts 42, e.g. boreholes.

Figure 5:
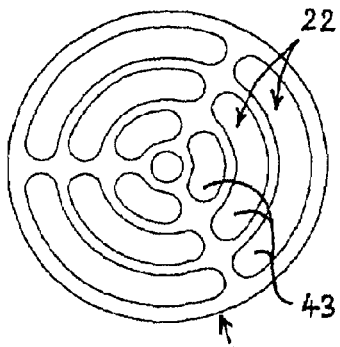

In the case of the example in accordance with FIG. 5 the structure 4 possesses several concentric regions of annular section-shaped ducts 43 for the formation of the infeed sub-sections 22. These annular section-shaped ducts 43 in the process each extend over approximately one third of the periphery of the structure 4 and are arranged at different concentric radii.

Figure 6:
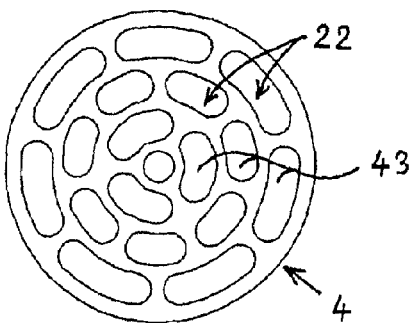

The structure 4 in accordance with FIG. 6 also possesses annular section-shaped ducts 43 for the formation of the infeed sub-sections 22, wherein however here the ducts 43 are shorter in peripheral direction in comparison to the example in accordance with FIG. 5 and each only extends over a smaller peripheral angular range.

Figure 7:
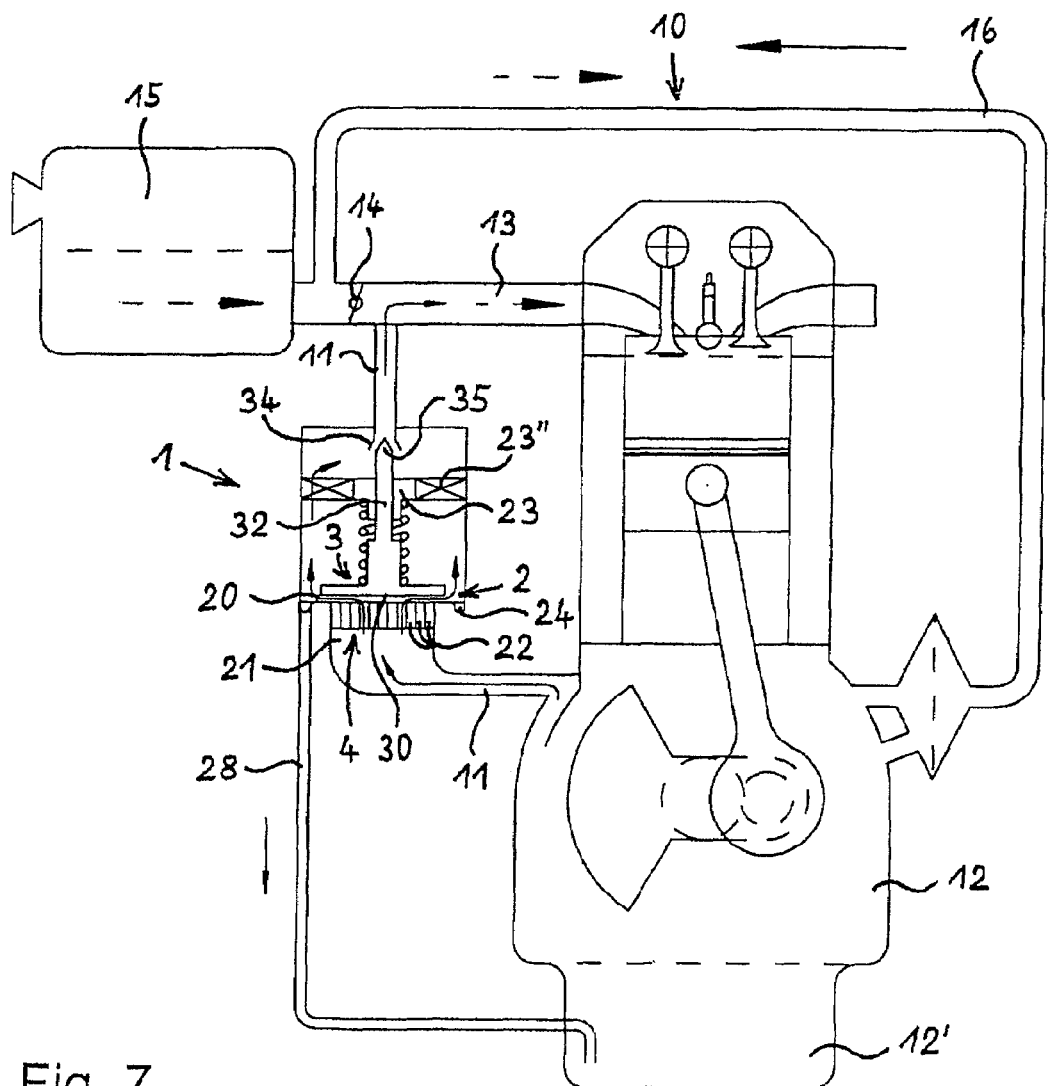
FIG. 7 shows an internal combustion engine, which is equipped with the device, in a schematic view.

FIG. 7 shows an internal combustion engine 10 equipped with the device 1 in schematic representation. The device 1 is connected to the crankcase 12 of the internal combustion engine 10 via a first section of the flow duct 11. The structure 4 for sub-division of the infeed cross-sections into the multitude of infeed sub-sections 22 is arranged upstream in the device 1. The valve body 3 lies above the structure 4, said valve body's underside baffle surface 30 forming together with the top side of the structure 4 the outlet 20 of the oil separator 2. Radially outside of the structure 4 and the valve body 3 the deflection region 24 runs in the device, said deflection region 24 also having the form of a launder open to the top. The deflection region 24 is connected to the lower part of the crankcase 12 via the oil return duct 28, here the oil sump 12', of the internal combustion engine 10, in order to return separated oil to the baffle surface 30 of the valve body 3 as a result of the deflection in the region of the outlet 20. Also in the case of the device 1 in accordance with FIG. 7 the valve body 3 possesses a guide section 32 in its upper portion, which is guided in the guide body 23. The body 23 serving the purpose of guiding the valve body 3 is also kept centered here via several radial running compensators 23" distributed within peripheral direction within the device 1.

Deviating from the example in accordance with FIG. 1 here the valve body 3 possess a conical end section 35 on the upper end of its guide section, said end section 35 cooperating with a conical outlet cross-section 34, which is formed at the beginning of the upper part of the flow duct 11. In the process the cooperation in this place is in contradiction to the cooperation of the valve body 3 with of the structure 4. This means that in the case of an elevation of the valve body 3 from the structure 4 on the basis of a corresponding pressure differential in the two parts of the flow duct 11 simultaneously the second outlet cross-section 34 is reduced by the conical end section 35. In this design the device 1 near to the oil separator 2 forms a flow control valve, which limits the maximum quantity of the volume flow of crankcase ventilation gas which can run from the crankcase 12 to the induction tract 13 of the internal combustion engine 10.

Simultaneously this additional function of the device 1 as a flow control valve makes possible an effective ventilation of the crankcase 12 with fresh air which however is limited to operationally meaningful quantities by means of a crankcase ventilation line 16 running above and to the right in FIG. 7. For this purpose fresh air purified via an air filter is branched off before a throttle valve 14 in the induction tract 13 and guided through the line 16 into the crankcase 12. With this the device 1 in the example in accordance with FIG. 7 serves as an oil separator 2 as well as simultaneously serving as a pressure control valve for the crankcase air extraction and as a flow control valve for the crankcase ventilation. In the process the device 1 advantageously requires only the axially displaceable valve body 3 as a movable element.

Figure 8:
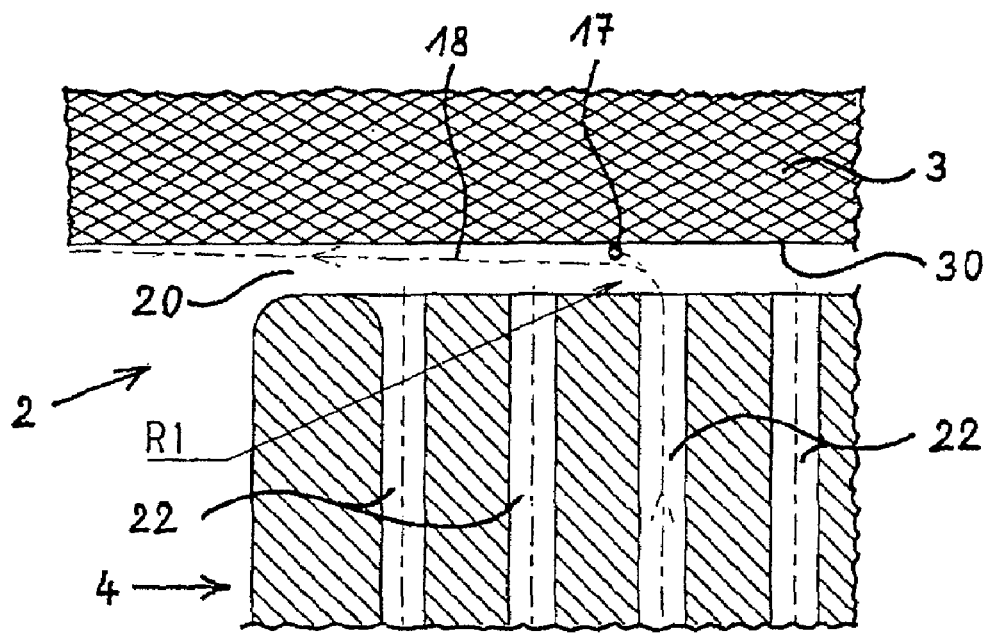
FIG. 8 shows an enlarged section of the device in accordance with FIG. 1 in longitudinal section.

FIG. 8 shows in an enlarged sectional display below a part of the structure 4 and above a part of the valve body 3, each in longitudinal section. The infeed sub-sections 22 are developed in the structure 4, said infeed sub-sections 22 running parallel to each other and perpendicular to the baffle surface 30 developed at the underside of the valve body 3. By means of a dotted line 18 a flow path is illustrated, via which one of the gas partial flows flows. The flow path 18 runs first through one of the infeed sub-sections 22 and on the basis of its relatively small cross-section necessarily in longitudinal direction of this infeed sub-section 22. Only after the escape of the gas partial flow from the infeed sub-section 22 is the flow path 18 in the outlet 20 very acutely, here with a small radius R1 by approximately 90°, deflected to the outside within a short axial segment in radial direction. This leads to the action of high centrifugal forces on oil particles, of which one is represented by the numeral 17. Through the high centrifugal force and through the inertia of masses of the oil particles 17 they cannot follow the acute deflection of the flow in the outlet 20, but rather rebound on the baffle surface 30 and are thus separated from the gas flow. This foregoing described separation effect follows in identical manner for every single infeed sub-section 22.

Figure 9:
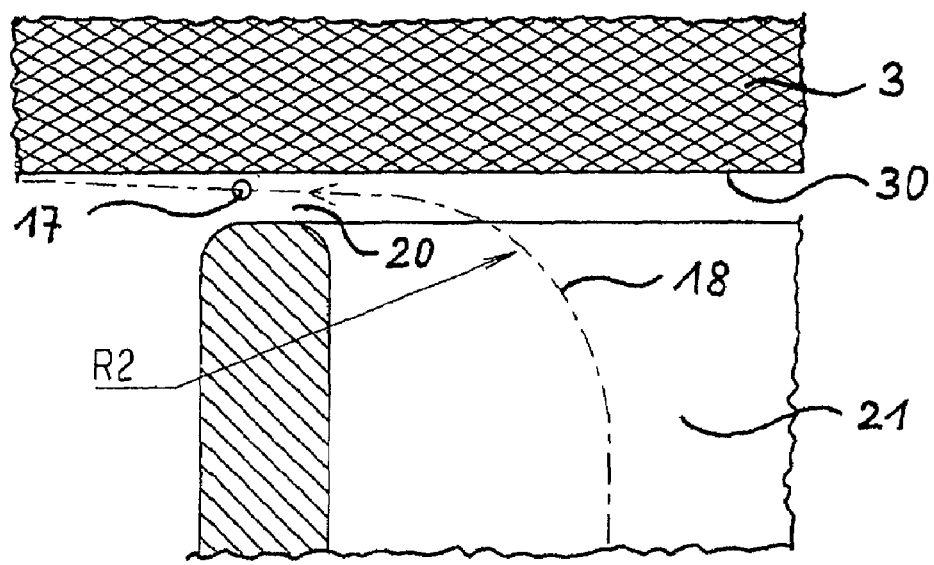
FIG. 9 shows a section from a device corresponding to the state of the art in the same representation as in FIG. 8.

FIG. 9 shows a section from a device corresponding to the state of the art in a representation corresponding with FIG. 8. In the case of the device according to the state of the art a uniform infeed cross-section 21 is present up to the region of the baffle surface 30 of the valve body 3, as a result of which the possibility arises for the gas flow of the crankcase ventilation gas to travel a flow path 18 with a relatively weak deflection and corresponding to a relatively large radius R2 in the region of the outlet 20 and even before it. On the basis of the large radius R2 only relatively weak centrifugal forces act on the oil particles 17, so that these can follow the flow path 18 of the gas for the most part and do not, as in and of itself would be desired, precipitate on the baffle surface 30. In particular this applies for relatively small oil particles 17, which are then not separated from the gas flow or at least are not separated in sufficient scale.

Figure 10:
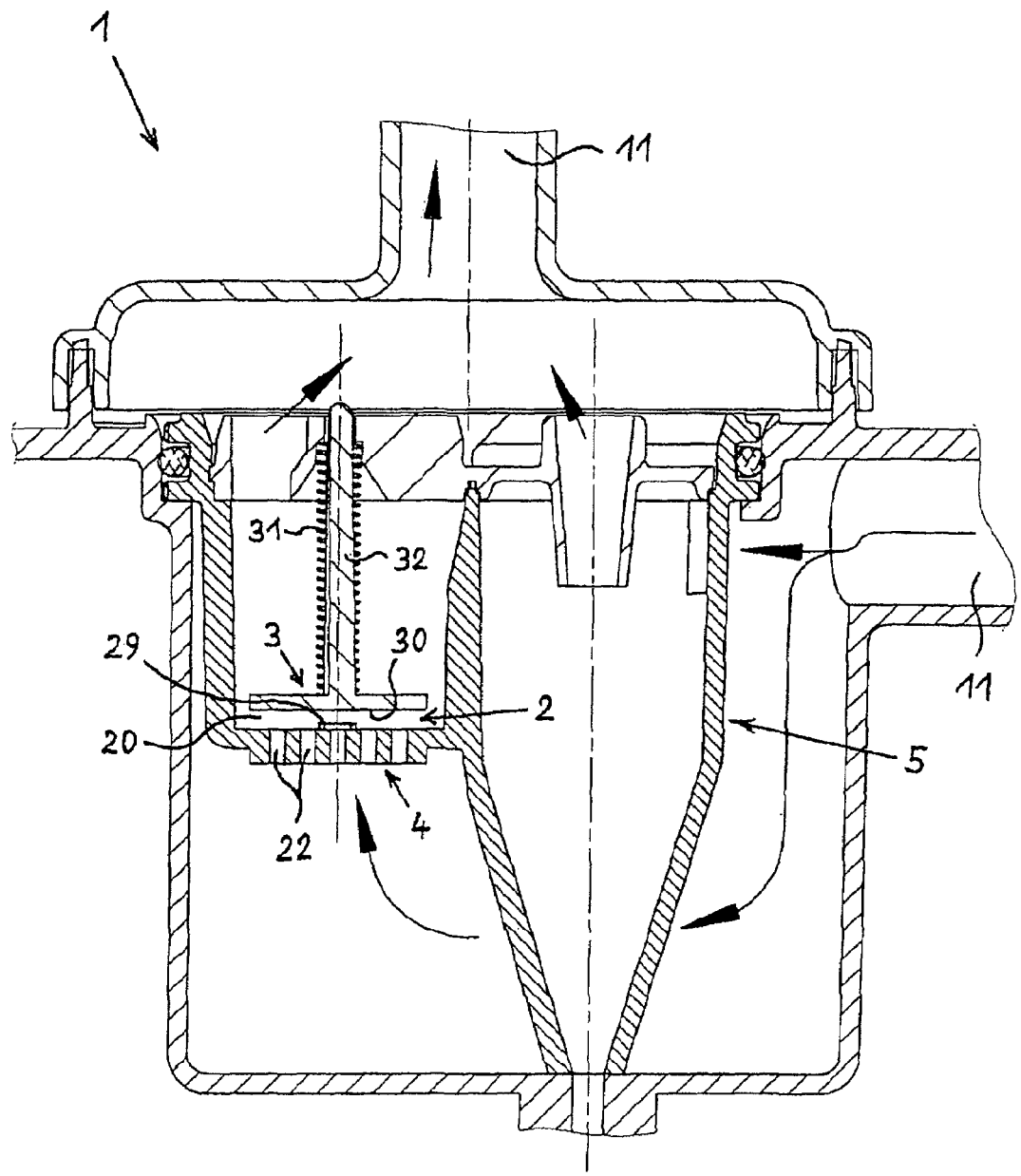
FIG. 10 shows the device in a further design, also in longitudinal section.

FIG. 10 shows a further exemplary embodiment of the device 1, again in longitudinal section. Here too the device 1 is inserted in the course of a flow duct 11 for crankcase air extraction of an internal combustion engine not shown here. The device 1 comprises in the process the oil separator 2, which is formed by the structure 4 with the infeed sub-sections 22 and by the baffle surface 30 of the valve body 3, wherein the baffle surface 30 and the top side of the structure 4 also form an outlet 20 here with an acute deflection for the gas partial flows.

On the top side of the structure 4 a closing stop 29 is provided here for the valve body 3, e.g. molded on in one piece as an annular ring. The closing stop 29 ensures that in closed position of the valve body 3 it maintains a small distance from the main surface of the top side of the structure 4. With this a disturbing freezing and adhering of the valve body 3 is prevented. At the same time even in the case of a very low pressure of the crankcase ventilation gas a small cross-section of flow through the outlet 20, connected with a desired oil separation, remains free.

At its side averted from the structure 4 the valve body 3 also possesses a guide section 32 here for axial guidance. A coil spring 31 is arranged around the section 32, which impinges the valve body 3 with a force in closing direction, thus in the direction toward the top side of the structure 4.

Additionally the device 1 in accordance with FIG. 10 comprises a further oil separator 5, which is developed here in the form of an in and of itself known cyclone separator and which is connected in parallel to the oil separator 2. Depending on the operating state of the associated internal combustion engine, in the case of slight and average quantities of crankcase ventilation gas first only the cyclone separator 5 is flowed through. In the case of greater quantities of crankcase ventilation gas, which overtax the cyclone separator 5 with regard to the possible flow rate and lead to a differential pressure increase, the valve body 3 automatically opens the outlet 20 on the basis of the present differential pressure, as a result of which a parallel flow path for the crankcase ventilation gas is released, upon which also an effective separation of oil particles in the region of the oil separator 2 formed by the structure 4 and the baffle surface 30.

FIGS. 11 and 12 show a further design of the device 1 in two different operating states in longitudinal section. The device 1 in accordance with FIGS. 11 and 12 also comprises the structure 4, above which the valve body 3 is arranged downstream with its underside baffle surface 30. Here too the valve body 3 is pre-tensioned via a spring 31 in closing direction, i.e. here in the direction toward the structure 4.

Downstream from the valve body 3, thus above it here, by means of ribs 23" a body 23 is again secured in the flow duct 11, said body limiting the axial mobility of the valve body 3.

In its upper part the valve body 3 is developed here with a conical section 35 which cooperates with a second outlet cross-section 34 developed in the flow duct 11.

In FIG. 11 the valve body 3 is removed from the top side of the structure 4, thus opened with regard to the outlet 20. In this position the valve body 3 fits on the body 23. By means of this maximum displacement of the valve body 3 in the upward direction the conical section 35 lies as far as possible within the outlet cross-section 34, as a result of which said outlet cross-section 34 now has its minimum cross-section of flow.

In FIG. 12 the valve body 3 is in its closed position, in which it lies with its baffle surface 30 on the top side of the structure 4 with the infeed sub-sections 22 and closes said infeed sub-sections 22.

By means of this position displaced as far as possible to the bottom the conical section 35 of the valve body 3 now lies as little as possible within the outlet cross-section 34, as a result of which section outlet cross-section 34 now has its maximum free cross-section of flow. In this way even in the case of the example in accordance with FIGS. 11 and 12 the device 1 obtains along with the function as an oil separator 2 also the function of a pressure control valve via the cooperation of the baffle surface 30 with the structure 4 and the function of a flow control valve through the cooperation of the conical section 35 with the outlet cross-section 34, wherein the pressure control valve and the flow control valve act in contradiction to each other.

In this context it is pointed out that the cross-section of flows in the examples represented in the drawing are not true to scale for recognition purposes and in practice as a rule are designed significantly smaller.

In FIGS. 13 and 14 a further design of the device 1 is shown in the same manner of representation as in FIGS. 11 and 12, again in two operating states. In contrast to the example according to FIGS. 11 and 12 in the case of the example according to FIGS. 13 and 14 no body 23 is provided as a stop; rather the valve body 3 can be displaced upward to the point that its conical section 35 fits tightly against the outlet cross-section 34. So that even in this state a gas flow of the crankcase ventilation gas through the device 1 remains possible in a predefinable minimum measure, a gas duct 33 is provided in the valve body valve body 3. This gas duct 33 runs from a place axially above the baffle surface 30 here radially from the outer periphery to the inside and from there in axial direction upward. In its other individual parts and functions the device 1 in accordance corresponds with FIGS. 13 and 14 of the previously described device 1 in accordance with FIGS. 11 and 12.

FIGS. 15 and 16 show a further design of the device 1, again in two operating states and in longitudinal section. Additionally FIG. 17 shows the device 1 in the cross-section in accordance with the intersection line B-B drawn in FIG. 16.

The valve body 3 is a cylindrical body in its basic form here, which is also guided in the device 1 here in an axially displaceable manner again and is pre-tensioned by the spring 31 in closing direction, thus in the direction toward the structure 4. As can be seen from FIGS. 15 through 17 the valve body 3 is provided here with a wedge-shaped running groove which forms a gas duct 33. Depending on the axial position of the valve body 3 relative to the rest of the device 1 the cross-section of the gas duct 33 is variable. In the process here too the arrangement is made in such a way that in the case of increasing cross-section of flow of the outlet 20 in the region of the oil separators 2 the cross-section of flow of the gas duct 33 is reduced and vice versa. As a result also in the case of the device 1 in accordance with FIGS. 15 through 17 the function of the oil separator 2 is combined with the functions of a pressure control valve and of a flow control valve.

Figure 18:
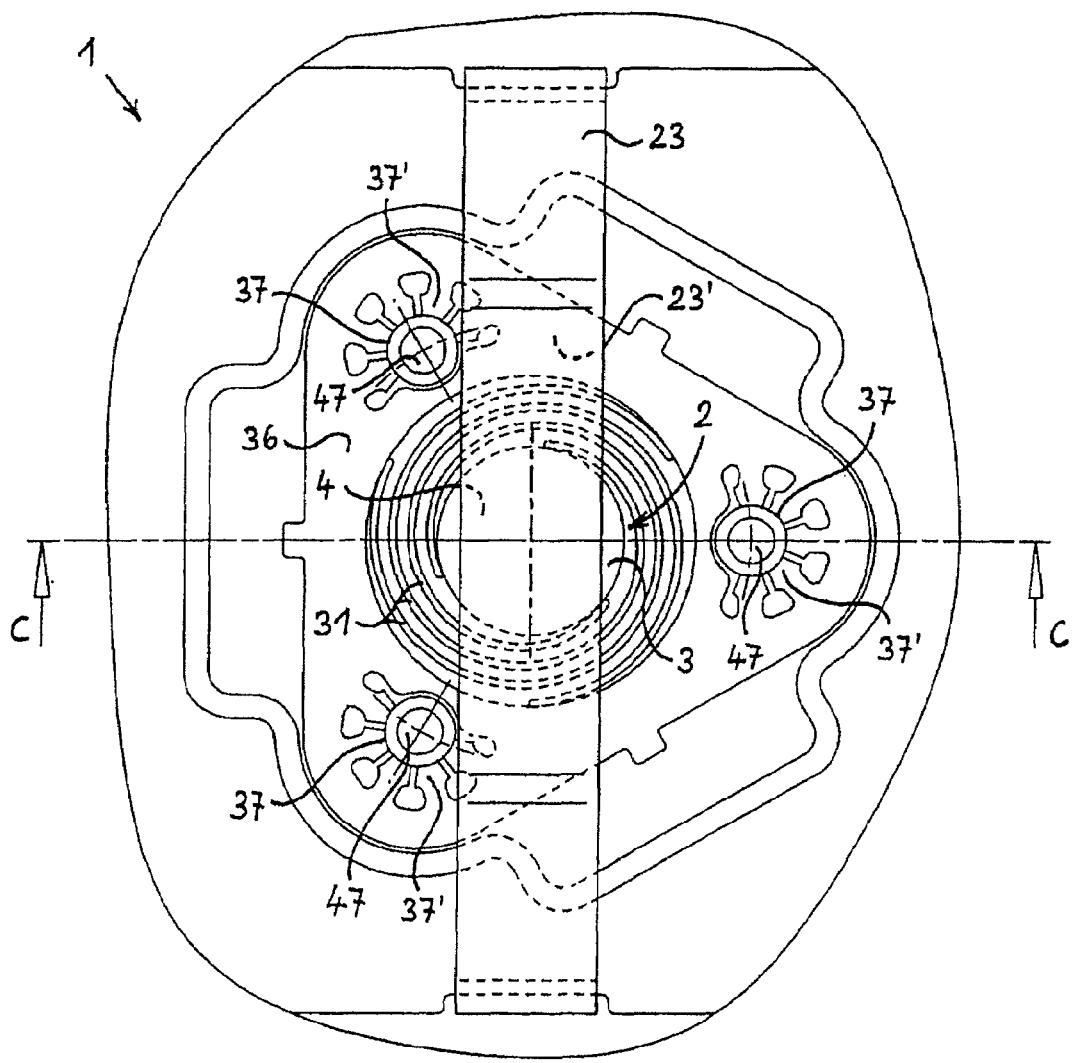
FIG. 18 shows the device in a further embodiment in a partial top view.

FIG. 18 shows a further design of the device 1 in a partial top view. In the center of FIG. 18 lies the round valve body 3, which is flat here, said valve body 3 being designed as a sheet metal disk. The valve body 3 is held here by means of a so-called meander spring 31 which is arranged spirally around the valve body 3. The valve body 3, the meander spring 31 and a region surrounding these together form a spring steel sheet part 36, which is manufactured in one piece as a stamped part. Three openings 37 are arranged here radially outward from the meander spring 31 in the spring steel sheet part 36, wherein each opening 37 is surrounded by a number of fixing tongues 37'.

Underneath the valve body 3 and the spring steel sheet part 36 the structure 4 lies here invisible, from whose top side three fixing pins 47 extend upward congruent to the openings 37. The spring steel sheet part 36 is placed on these fixing pins 47 by means of its openings 37, wherein through the fixing tongues 37' a movement of the spring steel sheet part 36 in the opposite direction is excluded. With this the spring steel sheet part 36 can be very easily connected to the structure 4 sufficiently rigid and durable.

By means of the meander spring 31 the valve body 3 is resiliently movable perpendicular to its surface plane, as a result of which the valve body 3 can displace in its position relative to the structure 4.

A U-shaped body 23 overlapping the top side of the structure 4 and the valve body 3 forms with its underside an opening stop 23' for the valve body 3. As a result the path of movement of the valve body 3 is limited in the direction of the structure 4 to the underside of the U-shaped body 23. The U-shaped body 23 can for example be locked into position with the other part of the device 1 that is visible here, in the case of the example in accordance with FIG. 18 on the upper and lower border by snap-in pins pointing downward.

Figure 19:
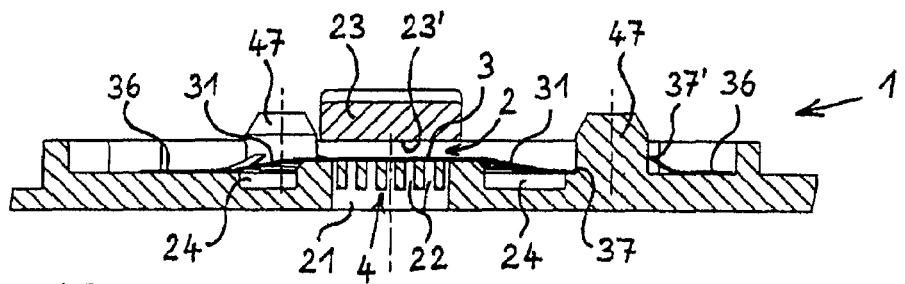
FIG. 19 shows the device from FIG. 18 in the cross-section along the intersection line C-C in FIG. 18.

FIG. 19 shows the device from FIG. 18 in the cross-section in accordance with intersection line C-C in FIG. 18. In the center of FIG. 19 the structure 4 is visible below, said structure 4 sub-dividing the infeed cross-section 21 into the multitude of infeed sub-sections 22. The valve body 3 lies above the structure 4, wherein here its flat, disk-shaped design becomes particularly clear. In the operating state represented in FIG. 19 the valve body 3 lies on the top side of the structure 4, thus is in its closed position.

The meander spring 31 which resiliently bears and guides the valve body 3 lies radially outside of the valve body 3, said meander spring 31 which together with the valve body 3 forms the spring steel sheet part 36 in a single piece. On the right in FIG. 19 the section runs through one of the openings 37 in the spring steel sheet part 36, wherein the opening 37 is surrounded by the fixing tongues 37' which secure the spring steel sheet part 36 on the fixing pin 47.

In the top center of FIG. 19 the U-shaped body 23 is visible in the section, said U-shaped body 23 forming the opening stop 23' for the valve body 3 with its underside.

When the pressure of the crankcase ventilation gas in the infeed cross-section 21 increases, the valve body 3 is displaced upward against the force of the meander spring 31, as a result of which an outlet between the top side of the structure 4 and the underside of the valve body 3 is released. Also in the case of this design of the device 1 a very acute deflection of the flow results for the individual partial flows of the crankcase ventilation gas which flow through the infeed sub-sections 22, said deflection of the flow leading to an impact separation of oil particles at the underside of the valve body 3. The oil separated by impact separation can then flow radially outward and is collected in deflection regions 24. From there the collected oil can be returned via flow paths not visible here to the oil sump of the associated internal combustion engine.

Figure 20:
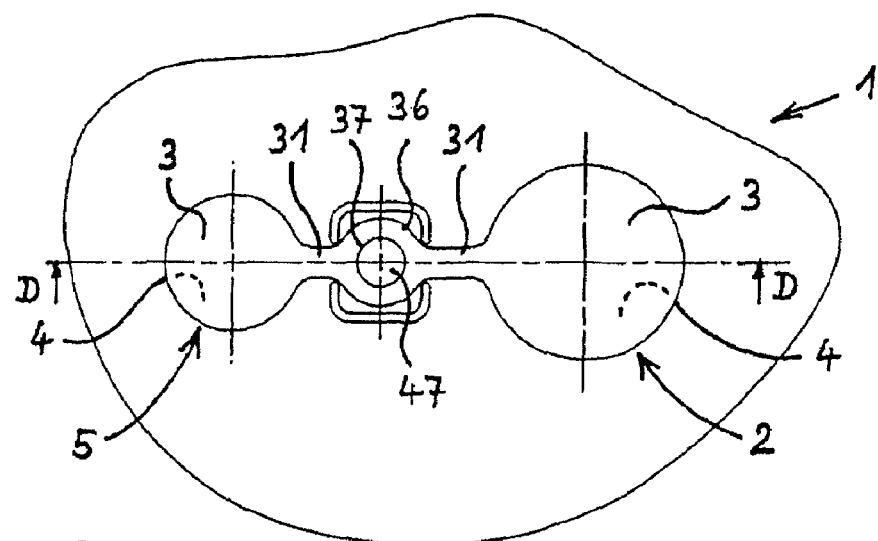
FIG. 20 shows the device in a further embodiment in a partial top view.

FIG. 20 shows a further, last design of the device 1, again in a partial top view. In this design the device 1 possesses two oil separators 2 and 5, which differ in their size.

The first oil separator 2 visible in FIG. 20 on the right is larger in its diameter and the second oil separator 5 visible on the left in FIG. 20 is designed smaller in diameter in proportion to it. Each oil separator 2 and 5 has a flat valve body 3 which is designed as a leaf valve. The two valve bodies 3 are each above a narrow section forming a spring 31 in a single piece with each other in combination and thus form a uniform spring steel sheet part 36. Between the two valve bodies 3 an opening 37 is positioned in the spring steel sheet part 36, said opening 37 being fixed on a fixing pin 47.

Underneath the valve body 3 a structure 4 is hidden and therefore invisible, said structure 4 sub-dividing the respective infeed cross-section into a number of infeed sub-sections.

Figure 23:
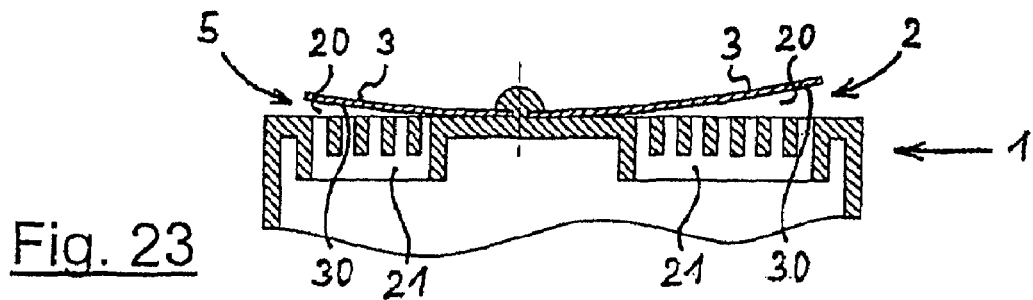
FIG. 21 through FIG. 23 show the device from FIG. 20 in the cross-section along the intersection line D-D in FIG. 20, in three different operating states.
Figure 22:
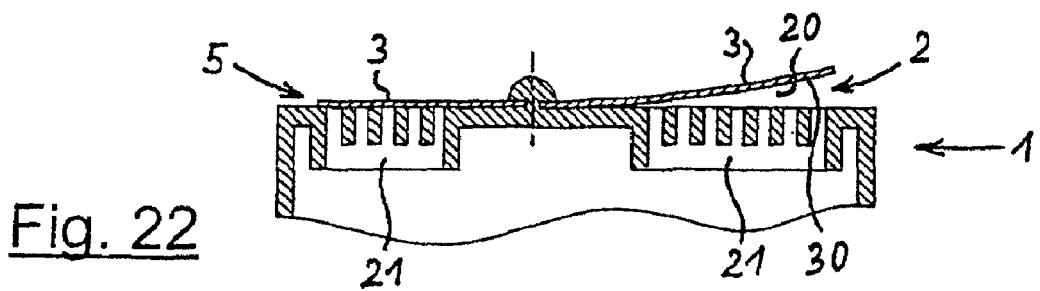
Figure 21:
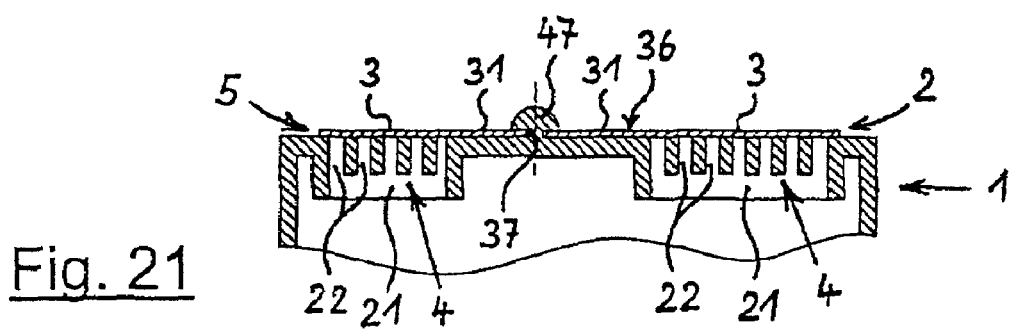

FIGS. 21 through 23 show the device 1 from FIG. 20 in cross-section in accordance with line D-D in FIG. 20, in three different operating states.

In all three FIGS. 21 through 23 a first oil separator 2 is visible on the right and the further second oil separator 5 is visible on the right. Also the different cross-sections of the two oil separators 2 and 5 become clear here, just as the sub-division of the respective infeed cross-sections 21 into a number of infeed sub-sections 21 by means of respective associated structure 4.

The valve bodies 3 are above the structures 4, said valve bodies 3 being parts of the spring steel sheet part 36.

In FIG. 21 the two valve bodies 3 are positioned at the top side of the respective associated structure 4 and are thus in closed position, which occurs in the case of lacking or very low pressure of the crankcase ventilation gas.

In FIG. 22 an increased pressure of the crankcase ventilation gas is present compared to FIG. 21, which results in the valve body 3 on the right in FIG. 22 being moved to its open position tilted upward. As a result of this, an outlet 20 is released in the oil separator 2 on the right in FIG. 22, leading to an impact separation of oil droplets from the crankcase ventilation gas at the underside of the valve body 3 by means of the acute deflection of the flow occurring here.

In the case of further increasing pressure of the crankcase ventilation gas, as FIG. 23 shows, the second oil separator 5 is also opened, by swiveling the valve body 3 located on the left in accordance with FIG. 23 through the even higher gas pressure also from its closed position to an open position. Here too an oil droplet separation from the crankcase ventilation gas at the underside of the associated valve body 3 arises by means of impact separation.

As FIGS. 20 through 23 illustrate, the two springs 31, which are formed by sections of the spring steel sheet part 36, are of different lengths, as a result of which correspondingly different spring constants are obtained. This, in combination with the varying size of the areas of the two valve bodies 3 under pressure, results in each valve body 3 having its own opening pressure, in which case it is removed from the top side of the structure 4. In this way a kind of register circuit of the two oil separators 2 and 5 can be achieved, which is automatically controlled by the pressure of the crankcase ventilation gas and with this dependent on the quantity of the crankcase ventilation gas. It is also possible to provide more than two oil separators here.

Figure 24:
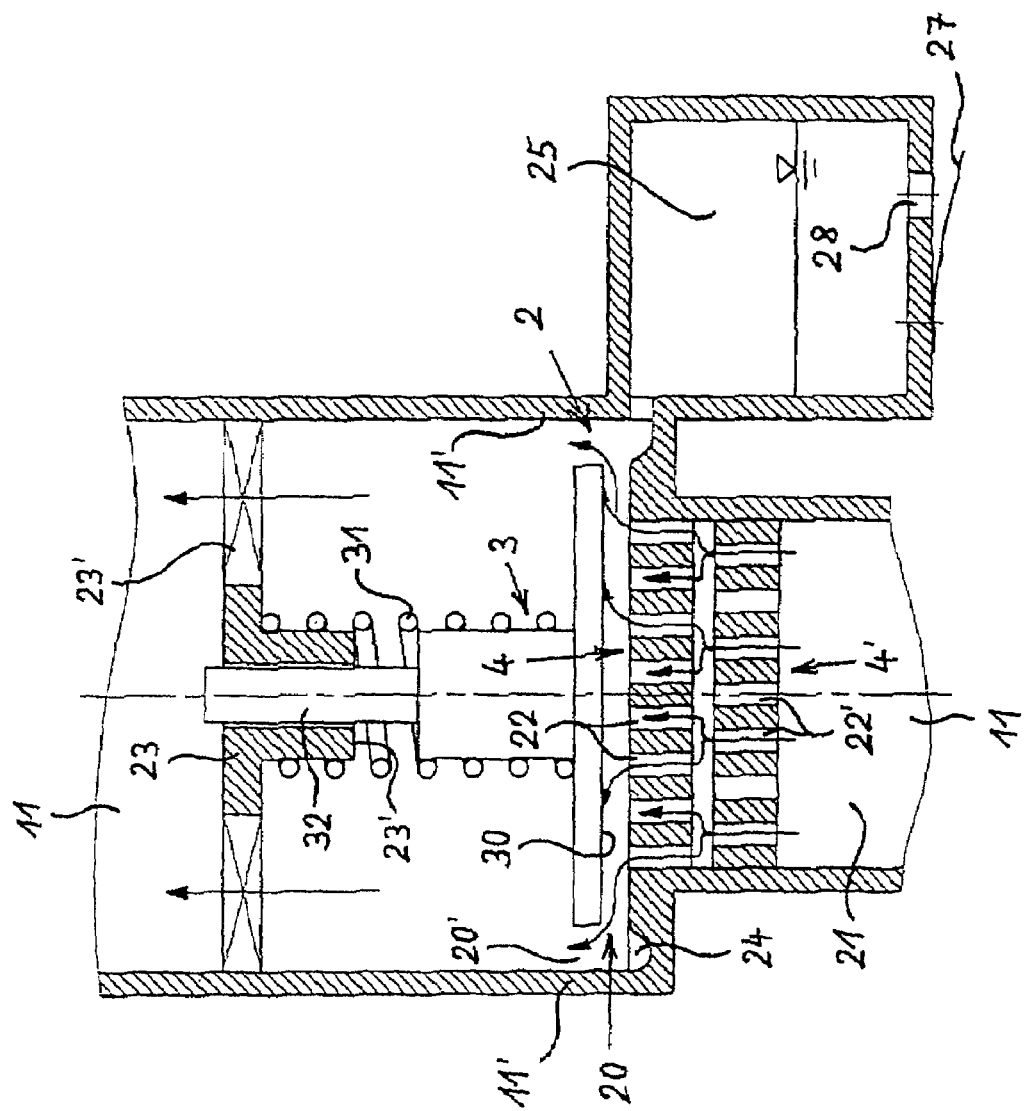
FIG. 24 shows the device in a further design in longitudinal section.

FIG. 24 shows an exemplary embodiment of the device, for which it is characteristic that in the infeed cross-section 21 two of these structures 4 and 4' sub-dividing said infeed cross-section 21 into the several infeed sub-sections 22, 22' and spaced axially apart from one another are arranged. In the process the infeed sub-sections 22 of the one structure 4, shown here above, relative to the infeed sub-sections 22' of the other structure 4', shown here below, exhibit an offset at a right angle to the longitudinal direction of the infeed sub-sections 22, 22'. With this, as indicated by the flow arrows in the region of the structures 4 and 4', an acute deflection of the flow of the partial flows arises in the region between the structures 4 and 4', as a result of which a first oil mist separation takes place in the region between the lower structure 4' and the upper structure 4.

The oil separated here can then either flow down against the gas flow under the influence of gravitational force and be returned on a path not shown here to the crankcase of the associated internal combustion engine or be carried up by the gas flow and then finally be separated at the baffle surface 30 or at the inner surface of the peripheral wall 11' of the gas duct 11. This separation is facilitated by the two structures 4 and 4', because these structures 4 and 4' contribute to the formation of larger oil droplets from the smaller oil droplets previously present in the gas flow.

At least one of the two structures 4 or 4' is advantageously manufactured in one piece with the remaining device 1, wherein this can for example be made of a thermoplastic synthetic material in the injection molding process. The other structure 4', shown here below, can be inserted from below as an initially separate element into the gas duct 11 and then be fixed in the fitting position, e.g. by means of locking into place or welding.

In the case of the example of the device 1 in accordance with FIG. 24 deflection of the flow is produced in three different places, each being combined with an oil mist separation:

The first deflection takes place between the two structures 4' and 4, the second deflection occurs between the upper structure 4 and the underside of the baffle surface 30 and the third deflection of the flow finally occurs between the radial outer border of the baffle surface 30 and the inner circumference of the peripheral wall 11' in the region of the annular gap 20', which represents a part of the outlet 20 of the device 1.

In its remaining parts and functions the device 1 corresponds to the exemplary embodiment according to FIG. 1 and reference is made to the description of FIG. 1 with regard to the further reference numerals used in FIG. 24.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A device for eliminating oil particles from crankcase ventilation gas in an internal combustion engine, wherein the device is located in a flow duct of the crankcase ventilation gas that runs from a crankcase to an induction tract of the internal combustion engine and wherein the device comprises an oil separator in the form of an outlet for the crankcase ventilation gas with a deflection of the flow, causing the oil particles to be deposited on a baffle surface and thus to be eliminated from the crankcase ventilation gas flow, the device comprising:
- an infeed cross-section lying upstream of the baffle surface when viewed from a flow direction of the crankcase ventilation gas, being sub-divided by at least one structure into a multitude of infeed sub-sections which together function as a flow straightener;
- the infeed sub-sections comprising openings in the structure and each opening having a center point, with adjacent sub-section openings being separated from each other by a land, wherein a distance between center points of adjacent sub-section openings being at least twice as great as a width of the land between the adjacent sub-section openings;
- the baffle surface being a solid surface that is devoid of perforations; and
- the baffle surface being configured on at least one valve body, which lies downstream of the infeed sub-sections when viewed in the flow direction of the crankcase ventilation gas and which is pre-tensioned by a force, the valve body being displaceable in an opening direction in opposition to a pre-tension, as a result of a differential pressure between the crankcase and the induction tract.

2. A device according to claim 1, wherein the infeed sub-sections run parallel to each other.

3. A device according to claim 1, wherein the infeed sub-sections each run at right angles to the baffle surface.

4. A device according to claim 1, wherein the infeed sub-sections each have the form of one of an oblong duct, a borehole and a nozzle.

5. A device according to claim 1, wherein the baffle surface is surrounded radially outwardly by a peripheral wall to provide an annular gap forming a part of the outlet.

6. A device according to claim 1, wherein in the case of a lack of differential pressure between the crankcase and the induction tract, the infeed sub-sections are sealed substantially gas-tight by the valve body.

7. A device according to claim 1, wherein a force which pre-tensions the valve body in a closing direction is at least the force of one spring.

8. A device according to claim 1, wherein in the case of the device in an operational position, the gas flow direction to the infeed sub-section runs in essence from the bottom to the top.

9. A device according to claim 8, wherein an embedded deflection region is constructed in the device radially outwardly of the baffle surface and below the baffle surface for oil precipitated on the baffle surface, and dripping or flowing from the baffle surface.

10. A device according to claim 9, wherein the deflection region has the form of a circulating gutter open to the top.

11. A device according to claim 9, wherein the deflection region is connected to an oil collecting chamber lying outside of the part of the device flowed through by the crankcase ventilation gas.

12. A device according to claim 11, wherein the oil collecting chamber is connected to the crankcase of the internal combustion engine via an oil drain valve and an oil return duct.

13. A device according to claim 12, wherein the oil drain valve is a differential pressure controlled valve which automatically opens in the case of a pressure corresponding to one of the pressure in the induction tract and a pressure lying below a pressure in the crankcase.

14. A device according to claim 1, wherein the oil separator in the form of the outlet with deflection of the gas flow and with the infeed cross-section subdivided into several infeed sub-sections is the sole oil separator used with the internal combustion engine for the crankcase ventilation gas.

15. A device according to claim 1, wherein at least one further oil separator for the crankcase ventilation gas is connected in parallel or in series to the oil separator having the form of the outlet with deflection of the flow and to the infeed cross-section sub-divided into several infeed sub-sections.

16. A device according to claim 15, wherein the at least one further oil separator for the crankcase ventilation gas exhibits an operating principle differing from the oil separator having the form of the outlet with deflection of flow and with the infeed cross-section subdivided into several infeed sub-sections.

17. A device according to claim 15, wherein the two or more oil separators each exhibit a different opening pressure of the crankcase ventilation gas, beginning at which the respective oil separator is flowed through.

18. A device according to claim 15, wherein the two or more oil separators are structurally and spatially combined in one unit.

19. A device according to claim 15, wherein the at least one further oil separator is one of a cyclone and coalescer.

20. A device according to claim 1, wherein a single structure is arranged in the infeed cross-section sub-dividing the infeed cross-section into the several infeed sub-sections.

21. A device according to claim 1, wherein at least two structures in the infeed cross-section sub-divide it into the several infeed sub-sections, the said structures being spaced axially apart from one another, wherein a longitudinal direction of the infeed sub-sections of one structure are arranged at a right angle to a longitudinal direction of the infeed sub-sections of the other structure.

22. A device according to claim 1, wherein the infeed sub-sections are formed by a lattice-like structure with an arrangement of ducts having polygonal cross-sections which comprise the infeed sub-sections.

23. A device according to claim 22, wherein the cross-section of the polygonal ducts is selected from the group consisting of rectangular, square, parallelogram-shaped and hexagonal.

24. A device according to claim 1, wherein the infeed sub-sections are formed by a perforated plate-like structure with an arrangement of ducts having round cross-sections which comprise the infeed sub-sections.

25. A device according to claim 1, wherein the infeed sub-sections are formed by means of a perforated plate-like structure with an arrangement of concentric ducts having annular shaped cross-sections which comprise the infeed sub-sections.

26. A device according to claim 1, wherein the valve body exhibits a guide section to provide an axially movable guidance in the flow duct at its side opposite from the baffle surface.

27. A device according to claim 1, wherein an opening stop is provided for limitation of an axial path of movement of the valve body in its opening direction.

28. A device according to claim 1, wherein a closing stop is provided for limitation of an axial path of movement of the valve body in its closing direction.

29. A device according to claim 1, wherein the valve body cooperates with a second outlet cross-section in an opposite direction to the outlet in which the oil separation takes place for the provision of a flow control valve.

30. A device according to claim 29, wherein the valve body is designed downstream with one of a conical and diagonal section, which is surrounded by the second outlet cross-section.

31. A device according to claim 29, wherein the valve body is constructed with at least one gas duct which is permeable by crankcase ventilation gas at the valve body sealing the second outlet cross-section.

32. A device according to claim 1, wherein the total area of the openings in the structure is at least 25% of a total surface area of the structure.

* * * * *